United States Patent [19]

Kawamura

[11] Patent Number: 4,855,180

[45] Date of Patent: Aug. 8, 1989

[54] PROCESS FOR PRODUCING OPTICAL ARTICLE HAVING ANTI-REFLECTION FILM

[75] Inventor: Kazunori Kawamura, Akishima, Japan

[73] Assignee: Hoya Corporation, Tokyo, Japan

[21] Appl. No.: 198,209

[22] Filed: May 24, 1988

[30] Foreign Application Priority Data

May 26, 1987 [JP]   Japan ................................ 62-0129208

[51] Int. Cl.⁴ ............................ B05D 5/06; B32B 5/16
[52] U.S. Cl. ..................................... 428/328; 351/163; 351/165; 427/164; 427/165; 427/407.1; 427/412.1; 427/419.3; 427/419.5; 428/331; 428/336; 428/412; 428/416; 428/432; 428/447; 428/448
[58] Field of Search ............ 427/164, 412, 165, 412.5, 427/419.5, 407.1, 419.3; 351/163, 165, 276 R; 428/328, 331, 336, 416, 412, 429, 432, 448, 447

[56] References Cited

U.S. PATENT DOCUMENTS

| | | | |
|---|---|---|---|
| 4,029,842 | 6/1977 | Yoshida et al. | 427/164 |
| 4,374,158 | 2/1983 | Taniguchi et al. | 427/164 |
| 4,753,516 | 6/1988 | Doi et al. | 427/164 |
| 4,765,729 | 8/1988 | Taniguchi et al. | 427/164 |

Primary Examiner—Janyce A. Bell
Attorney, Agent, or Firm—Nixon & Vanderhye

[57] ABSTRACT

The present invention relates to a process for producing an optical article with an anti-reflection film, which process can be preferably used to endow an optical article such as plastic lens or the like with an excellent anti-reflection property.

8 Claims, No Drawings

PROCESS FOR PRODUCING OPTICAL ARTICLE HAVING ANTI-REFLECTION FILM

BACKGROUND OF THE INVENTION

1. Field of the Invention

The present invention relates to a process for producing an optical article with an anti-reflection film. The process of the present invention can be preferably used to endow an optical article such as plastic lens or the like with an anti-reflection property.

2. Description of the Prior Art

In plastic lenses with an anti-reflection film, the film has been formed using a method such as vapor deposition, ion sputtering or the like. As compared with inorganic glass lenses with an anti-reflection film, plastic lenses with an anti-reflection film have had problems in that the base material (plastic lens) and the anti-reflection film are largely different in expansion coefficient and moreover low in adhesion to each other. The plastic lenses with an anti-reflection film have had a further problem in that when an anti-reflection film of inorganic substance is formed on a plastic lens according to, for example, a vapor deposition method, a high vacuum and a long production time are required, making the productivity and economy insufficient.

Hence, as a method replacing the vacuum deposition method or the ion sputtering method, there was developed a coating method wherein a liquid coating composition containing, as film-forming components, an inorganic compound (e.g. colloidal silica) or an organic compound (e.g. organic silicon compound) is coated on a plastic lens and then the resulting lens is heated to form an anti-reflection film thereon. For instance, Japanese Patent Application Kokai (Laid-Open) No. 23036/1985 discloses a method for forming a two-layer anti-reflection film on a plastic lens using two liquid organic coating compositions each containing, as a film-forming component, a glycidoxyalkyltrialkoxysilane or its hydrolyzate, wherein the coating composition for the first layer film further contains a titanium compound (e.g. titanium tetraalkoxide) and an organic carboxylic acid (e.g. acetic acid) in order to provide an anti-reflection film of superior tintability and staining resistance.

The plastic lenses with an anti-reflection film obtained by coating liquid coating compositions in two layers according to, for example, the above method of Japanese Patent Application Kokai (Laid-Open) No. 23036/1985, as compared with those obtained according to the vapor deposition method, are superior in heat resistance, tintability by disperse dye, etc. but inferior in scratching resistance of anti-reflection film, giving rise to the peeling of the anti-reflection film. This reduction in scratching resistance in the plastic lenses with an anti-reflection film obtained according to the coating method is particularly striking, for example, when the lenses have been subjected to a tinting treatment or to high temperature-high humidity conditions for a long period of time, and in such cases, there also occur an undesirable problem of change of interference color due to the shift of wavelength at minimum reflectivity in a visible light range. This phenomenon is attributed to the film-forming components, particularly the titanium tetrabutoxide which is the high refractive index component of the first layer film. This component is rapidly hydrolyzed by water or humid air and simulataneously is condensed and accordingly, when allowed to stand in an atmosphere of controlled humidity, forms a colorless and transparent film having a structure close to titanium oxide. However, unless the drying or curing of the first layer film contaning an organic silance compound and the above mentioned titanium tetrabutoxide is conducted under an appropriately controlled (increased) humidity, unreacted components remain in the film and, after the formation of an anti-reflection film, these unreacted components cause the above mentioned problem when subjected to a hot water treatment, etc. Further, the water-repellent and smooth surface of the first layer film makes low the adhesivity of the second layer film to the first layer film.

In order to solve these problems, it is known that the first layer film is dried and/or cured at an elevated temperature and under an increased humidity and further the first layer film is subjected to a plasma treatment to enhance the adhesivity between the first layer film and the second layer film. It is also known that an undercoat is formed between the base material (plastic lens) and the anti-reflection film to improve the scratching resistance of the anti-reflection film. However, these approaches require a special operational technique (e.g. plasma treatment, chemical treatment) and invite new problems such as increase in process steps and resulting possibility of increased contamination with foreign matters.

Hence, the first object of the present invention is to provide an optical article with a two-layer anti-reflection film having excellent adhesivity between the first layer film and the second layer film without subjecting the first layer film to a surface treatment.

The second object of the present invention is to provide an optical article with a two-layer anti-reflection film having excellent scratching resistance without using an undercoat between the base material and the film.

The third object of the present invention is to provide an optical article with a two-layer anti-reflection film whose scratching resistance and adhesivity to the base material remain unchanged even after having been subjected to a tinting treatment or to severe conditions (e.g. high temperature-high humidity conditions).

The other objects of the present invention will be apparent from the following description.

SUMMARY OF THE INVENTION

The above objects of the present invention have been achieved by a process for producing an optical article with an anti-reflection film, which comprises:

a first step of coating on an optical article having a refractive index of less than 1.65, a first liquid composition satisfying the rquirements described later and then heat-curing the coated composition to form a first layer film of high refractive index having an optical film thickness of $\lambda/4$ (100–200 nm), and a second step of coating on the first layer film of high reflective index formed in the above step, a second liquid composition satisfying the requirements described later and then heat-curing the coated composition to form a second layer film of low refractive index having an optical film thickness of $\lambda/4$ (100–200 nm).

A. Requirements for the First Liquid Composition (1) The first liquid composition contains an alcohol-dispersed antimony pentoxide sol [component (a)] having particle diameters of 20–100 m$\mu$, a hydrolyzate of a $\gamma$-glycidoxypropyltrialkoxysilane [component (x)], a curing agent and a solvent.

(2) The component (a) and the component (x) have such a quantitative relationship that the amount of the component (a) is 55-85 mole % in terms of $Sb_2O_5$ and the amount of the component (x) is 45-15 mole %.

B. Requirements for the Second Liquid Composition (1) The second liquid composition contains colloidal silica [component (b)], a hydrolyzate of a γ-glycidoxypropyltrialkoxysilane [component (x)], a hydrolyzate of a γ-methacryloxypropyltrialkoxysilane [component (y)], a curing agent and a solvent.

(2) The hydrolyzates of the component (x) and the component (y) are obtained by the simultaneous hydrolysis of the component (x) and the component (y), and the molar ratio of the component (x)/the component (y) is 1/1 to 9/1.

(3) The component (b), the component (X) and the component (y) have such a quantitative relationship that the amount of the component (b) is 60-80 mole % in terms of $SiO_2$ and the total amount of the component (x) and the component (y) is 40-20 mole %.

DETAILED DESCRIPTION OF THE INVENTION

As the optical article used in the process of the present invention, there can be mentioned a plastic lens made of diethylene glycol bisallylcarbonate (CR-39), polymethyl methacrylate, polycarbonate or the like. The optical article is not restricted thereto but its refractive index is restricted to less than 1.65. Since the anti-reflection film is constituted by two layers of a first layer film of high refractive index and a second layer film of low refractive index, the effect of the first layer film can be exhibited only when the optical article itself as a base material has a lower refractive index than the first layer film. A film consisting only of antimony pentoxide which is the main component of the first layer film has a refractive index of about 1.7 and the first layer film containing antimony pentoxide and other film-forming components has a maximum refractive index of about 1.65. Therefore, the refractive index of the base material (the optical article) is restricted to less than 1.65, and such a value as less than 1.6 is preferable. It is a matter of course that the fitrst layer film has a higher refractive index than the base material. Incidentally, the optical article may be subjected, before being coated with the first liquid composition, to a surface treatment (e.g. acid treatment, alkali treatment, plasma treatment) in order to increase the adhesion between the optical article and the first liquid composition.

The first step of the process of the present invention is a step of coating on an optical article having a refractive index of less than 1.65, a first liquid composition satisfying the above mentioned requirements A (1) and A (2) and then heat-curing the coated composition to form a first layer film of high refractive index having an optical film thickness of λ/4 (100-200 nm).

First, detailed explanation is made on the requirement A (1) which stipulates the essential components of the first liquid composition.

As is clear from the requirement A (1), the first liquid composition contains, as essential components, an alcohol-dispersed antimony pentoxide sol [component (a)], a hydrolyzate of a γ-glycidoxypropyltrialkoxysilane [component (x)], a curing agent and a solvent.

The component (a), namely, the alcohol-dispersed antimony pentoxide sol is used as a high refractive index component. An antimony pentoxide sol can be obtained as an antimony pentoxide dispersion in water, alcohol, toluene or the like. However, the antimony pentoxide sol used as a high refractive index component in the first liquid composition of the present invention is restricted to an alcohol-dispersed antimony pentoxide sol which is stable, has good compatibility with the film-forming component, the curing agent and the solvent, causes no reduction in transparency during the formation of an anti-reflection film, induces no inclusion of foreign matters, causes no unevenness of interference color and is superior in hot water resistance, moisture resistance and scratching resistance. The particle diameters of the antimony pentoxide sol are restricted to 20-100 mµ. The reason is as follows. When the particle diameters are less than 20 mµ, the first layer film formed by heating the first liquid composition at, for example, 60°-120° C. has a significantly reduced refractive index due presumably to the increase of fine pores present in the film or at its surface and, moreover, the resulting anti-reflection film is deteriorated in moisture resistance, etc. When the particle diameters are more than 100 mµ, the resulting anti-reflection film causes unevenness of interference color and has no good transparency, and moreover, the first layer fim of high refractive index has an optical film thickness deviating from the range (100-200 nm) specified in the present invention, allowing the anti-reflection film to have a reduced anti-reflection property.

The hydrolyzate of the γ-glycidoxypropyltrialkoxysilane [component (x)] contained as an essential component in the first liquid composition is used as a film-forming component intended mainly for the increase of film hardness. Typical examples of the γ-glycidoxypropyltrialkoxysilane [component (x)] include γ-glycidoxypropyltrimethoxysilane, γ-glycidoxypropyltriethoxysilane, γ-glycidoxypropyltripropoxysilane and γ-glycidoxypropyltributoxysilane.

The 65-glycidoxypropyltrialkoxysilane is represented by the structural formula

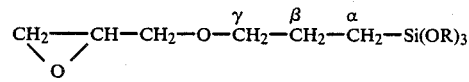

and has a glycidoxy group as a substituent at the γ-position carbon. The compounds represented by the above structural formula are stable and give a higher film hardness than the compounds having a longer chain between the glycidoxy group and the —Si(OR)₃ group. In the present invention, a hydrolyzate of such a compound is used.

The first liquid composition further contains a curing agent as an essential component. As the curing agent, there can be used a metal chelate compound such as aluminum acetylacetonate, zirconium acetylacetonate or the like, or a fatty acid salt such as sodium acetate or the like.

The first liquid composition furthermore contains a solvent (a solid content-adjusting agent) as an essential component. As the solvent, there can be used any solvent as long as it exhibits a function as a solid content-adjusting agent. There can be preferably used 2-propanol, 1-butanol, 2-methoxyethanol, etc.

Next, explanation is made on the requirement A (2) which stipulates the quantitative relationship between the essential components of the first liquid composition.

In the first liquid composition, the proportions of the alcohol-dispersed antimony pentoxide sol having particle diameters of 20–100 mμ [component (a)] and the γ-glycidoxypropyltrialkoxysilane [component (x)] are restricted to 55–85 mole % (in terms of $Sb_2O_5$) and 45–15 mole %, respectively. When the proportion of the component (a) is less than 55 mole % and the proportion of the component (x) is more than 45 mole %, the amount of the component (a), i.e. antimony pentoxide as a high refractive index component is too little and the first layer film of high refractive index has no desired refracitve index, and moreover, the amount of the component (x) is too much and the wettability of the second liquid composition on the first liquid composition of high refractive index is reduced (the second liquid composition is repelled), making it impossible to uniformly coat the second liquid composition and to obtain a two-layer anti-reflection film giving no unevneness of interference color. When the proportion of the component (a) is more than 85 mole % and the proportion of the component (x) is less than 15 mole %, the formability of the first layer film of high refractive index is poor and the final optical article with an anti-reflection film has low scratching resistance under humid conditions. It is particularly preferable that the proportion of the component (a) be 55–70 mole % and the proportion of the component (x) be 45–30 mole %.

It is preferable that the curing agent (e.g. metal chelate compound) used for curing the first layer film-forming component be added in an amount of 0.1–10% by weight based on the total solid content of the first liquid composition (i.e. the total film-forming components of the first layer film of high refractive index). Particularly preferably, the curing agent is added in an amount of 1–5% by weight in view of the pot life of the first liquid composition and the hardness, appearance, etc. of the first layer film of high refractive index.

In addition to the above mentioned essential components, the first liquid composition may further contain a lubricant and various additives conventionally used in such a composition. The lubricant is to enhance the uniformity of the first liquid composition and the wettability and smoothness of the first liquid composition when coated on the optical article. Examples of the lubricant include surfactants of silicon or fluorine type. In adding the lubricant, care must be taken so as not to cause the reduction of film hardness or film adhesion due to the addition of the lubricant. The addition amount of the lubricant should be 0.1–5% by weight based on the solid content of the first liquid composition (i.e. the total film-forming components of the first layer film of high refractive index).

The first liquid composition may also contain, as an additive, an orgnaic carboxylic acid such as acetic acid or the like in order to enhance the stability (pot life) of the hydrolyzate of the γ-glycidoxypropyltrialkoxysilane.

The preparation of the first liquid composition is explained next. The first liquid composition can be obtained by mixing an alcohol-dispersed antimony pentoxide [component (a)], a hydrolyzate of a γ-glycidoxypropyltrialkoxysilane [component (x)], a curing agent and a solvent (a solid content-adjusting agent) together with optional components such as a lubricant and acetic acid, stirring them at 0°–20° C. for 1–24 hours, and aging them for a predetermined length of time. The resulting liquid composition has a pot life of, for example, about one month at 5° C.

The coating of the thus obtained first liquid composition on an optical article is made using a method such as dipping, spin coating or the like. The spin coating method is preferred in order to allow the formed anti-reflection film to have a uniform thickness so as not to cause the unevenness of interference color.

The first liquid composition coated on an optical article is heat-cured under ordinary heat-curing conditions to obtain a first layer film of high refractive index. One example of the heat-curing conditions is heating at 80°–150° C. (depending upon the kinds and properties of the optical article) by means of, for example, hot air or far infrared rays.

The optical film thickness (refractive index x film thickness) of the first layer film of high refractive index is determined by the wavelength of the minimum reflectivity. When the wavelength of the minimum reflectivity is in a visible light range, the optical film thickness of the first layer film obtained by coating the first liquid composition alone and heat-curing it is 100–200 nm.

The second step of the process of the present invention is a step of coating on the first layer of high refractive index formed in the first step, a second liquid composition satisfying the above mentioned requirements B (1), B (2) and B (3) and then heat-curing the coated composition to form a second layer film of low refractive index having an optical film thickness of λ/4 (100–200 nm).

Firstly, detailed explanation is made on the requirement B (1) which stipulates the essential components of the second liquid composition.

As is clear from the requirement B (1), the second liquid composition contains, as essential components, colloidal silica [component (b)], a hydrolyzate of a γ-glycidoxypropyltrialkoxysilane [component (x)], a hydrolyzate of a γ-methacryloxypropyltrialkoxysilane [component (y)], a curing agent and a solvent.

The colloidal silica [component (b)] is used as a component for forming a low refractive index film and can be used in a form of a water or alcohol dispersion. The colloidal silica is not critical as to its particle diameters, but there is used such coloidal silica that has particle diameters smaller than the film thickness of the second layer film of low refractive index.

The hydrolyzate of the γ-glycidoxypropyltrialkoxysilane [component (x)] is used as a film-forming component, as in the first liquid composition. As the γ-glycidoxypropyltrialkoxysilane [component (x)] in the second liquid composition, there can be used the same compounds as in the first liquid composition. The reason why the hydrolyzate of the γ-glycidoxypropyltrialkoxysilane is preferentially used among the hydrolyzates of γ-glycidoxyalkyltrialkoxysilanes was explained with respect to the first liquid composition; therefore, no repeated explanation is made to avoid duplication.

The second liquid composition contains, as an essential component, the hydrolyzate of the γ-methacryloxypropyltrialkoxysilane [component (y)] together with the hydrolyzate of the component (x). The reason why the second liquid composition contains the hydrolyzate of the component (y) not used in the first liquid composition, together with the hydrolyzate of the component (x) is as follows. That is, the hydrolyzate of the γ-glycidoxypropyltrialkoxysilane [component (x)] has conventionally been used also as a component for improving the permeability of a disperse dye in a silicone type coating agent containing an organic silicate or colloidal silica. When it is inftended to improve the disperse dye permeability only with the above component, it is necessary to age the component after hydrolysis and also after the addition of a curing agent. When the aging is insufficient, the resulting disperse dye permeability is very low. Meanwhile, when the aging is excessive, the disperse dye permeability is improved but there arises problems in scratching resistance, moisture resistance and adhesion of film as well as problems of non-uniformity of film thickness. These problems are caused by the agglomeration of the hydrolyzate of the γ-glycidoxypropyltrialkoxysilane [component (x)]. This agglomeration is striking after the addition of the curing agent, and when only the hydrolyzate of the component (x) is used as an improver for the disperse dye permeability in the second layer film of low refractive index containing colloida silica and having a film thickness of 100–200 nm, the resulting anti-reflection film has various problems such as variations in optical film thickness, properties and appearance (e.g. interference color). Further, when the second layer film is formed by a two-component system comprising the hydrolyzate of the component (x) and colloidal silica, the resulting anti-reflection film has very low disperse dye permeability. Hence, in the second liquid composition, the hydrolyzate of the γ-methacryloxypropyltrialkoxysilane [component (y)] is used together with the hydrolyzate of the γ-glycidoxypropyltrialkoxysilane [component (x)]; the hydrolyzate of the component (x) is allowed to act not as an improver for disperse dye permeability but as an improver for scratching resistance and also as an improver for the compatibility between other essential components contained in the second liquid composition; and the hydrolyzate of the component (y) is allowed to act as an improver for disperse dye permeability.

As the γ-methacryloxypropyltrialkoxysilane [component (y)], there can be mentioned γ-methacryloxypropyltrimethoxysilane, γ-methacryloxypropyltriethoxysilane, γ-methacryloxypropyltripropoxysilane, γ-methacryloxypropyltributoxysilane, etc. The reason why the hydrolyzate of the γ-methacryloxypropyltrialkoxysilane [component (y)] is used in the second liquid composition is that the hydrolyzafe can contribute to the improvement of film hardness more than the component (y).

The γ-methacryloxypropyltrialkoxysilane [component (y)] is represented by the structural formula

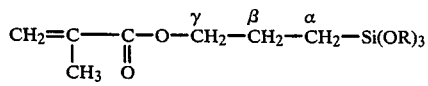

and has a methacryloxy group as a substituent at the γ-position carbon. These compounds are stable and can give a film of higher hardness than similar compounds having a longer chain between the methacryloxy group and the —Si(OR)₃ group. In the present invention, the above compounds are used after hydrolysis.

Similarly to the first liquid composition, the second liquid composition contains, as essential components, a curing agent and a solvent (a solid content-adjusting agent). The types of the curing agent and the solvent are same as those in the first liquid composition; therefore, no repeated explanation is made to avoid duplication.

Next, explanation is made on the requirement B (2) stipulating the production of the hydrolyzates of the component (x) and the component (y) as well as the quantitative relationship between these two components. The hydrolyzates of the component (x) and the component (y) must be those obtained by subjecting a mixture of a γ-glycidoxypropyltrialkoxysilane [component (x)] and a γ-methacryloxypropyltrialkoxysilane [component (y)] to simultaneous hydrolysis. The reason is that when the above two organic silane compounds are hydrolyzed separately and the resulting two hydrolyzates are added to colloidal silica to obtain a second liquid composition, the second liquid composition becomes cloudy and causes gelation.

The molar ratio of the component (x)/the component (y) is restricted to 1/1 to 9/1. When the molar ratio is less than 1/1, the resulting anti-reflection film has low scratching resistance. When the molar ratio is more than 9/1, the film has low tintability by disperse dye. The molar ratio is preferably 1/1 to 5/1.

Then, explanation is made on the requirement B (3) stipulating the quantitative relationship between the essential components of the second liquid composition. In the quantitative relationship of colloidal silica [component (b)], the γ-glycidoxypropyltrialkoxysilane [component (x)]and the γ-methacryloxypropyltrialkoxysilane [component (y)], the amount of the component (b) in terms of SiO₂ is restricted to 60–80 mole % and the total amount of the component (x) and the component (y) is restricted to 40–20 mole %. When the amount of the component (b) is more than 80 mole % and the total amount of the component (x) and the component (y) is less than 20 mole %, the resulting second layer film of low refractive index has a large friction coefficient and low scratching resistance. When the amount of the component (b) is less than 60 mole % and the total of the component (x) and the component (y) is more than 40 mole%, the second layer film of low refractive index is inferior in moisture resistance, etc.

Similarly to the first liquid composition, the second liquid composition can optionally contain a lubricant and various additives (e.g. acetic acid) conventionally used in such a composition. The conditons (e.g. addition amount) for these optional components are same as in the first liquid composition.

The preparation of the second liquid composition is explained. The second liquid composition is obtained by mixing a γ-glycidoxypropyltrialkoxysilane [component (x)] and a γ-methacryloxypropyltrialkoxysilane [component (y)] by stirring, hydrolyzing the resulting mixture in the presence of a mineral acid such as hydrochloric acid or the like, mixing the resulting hydrolyzate solution with colloidal silica, adding thereto a curing agent, a solvent (a solid content-adjusting agent) and, as necessary, optional components such as a lubricant, acetiac acid and the like, and mixing them by stirring.

Advantageously, the second liquid composition can be used without subjecting to aging after addition of the curing agent. (The aging is ordinarily conducted for 1 day to 1 month at 0°–20° C.)

As in the case of the first liquid composition, the coating of the thus obtained second liquid composition on the first layer film formed on an optical article is conducted using a method such as dipping, spin coating or the like. The spin coating method is preferred.

The heat curing of the second liquid composition coated on the first layer film is conducted under the same conditions as in the case of the first liquid composition.

The optical film thickness of the second layer film of low refractive index is set so as to be same as that of the first layer film of high refractive index, i.e. at 100–200 nm.

As explained in detail above, the process of the present invention enables the production of an opitcal article with a two-layer anti-reflection film consistig of a first layer film of high refractive index and a second layer film of low refractive index.

EXAMPLE

The present invention is explained in more detail by way of example.

1. Preparation of Hydrolyzates (1) The hydrolyzate of γ-glycidixypropyltrimethoxysilane (this hydrolyzate is hereafter referred to as GH) for use in the first liquid composition was prepared as follows. That is, 10.8 g of water was added to 0.2 mole of γ-glycidoxypropyltrimethoxysilane (hereinafter referred to as G). Thereto was added 2-methoxyethanol to obtain 78 g of a mixture. The mixture was cooled in a water bath. Then, while the mixture was being stirred at 10°–20° C., 2.0 g of 0.6N hydrochloric acid was added dropwise. After the dropwise addition, the whole mixture was stirred for about 2 days with water cooling, to obtain 80 g of a GH solution in 2-methoxyethanol.

(2) The simultaous hydrolyzate of γ-glycidoxypropyltrimethoxysilane and γ-methacryloxypropyltrimethoxysilane (the hydrolyzate is hereinafter referred to as GMH) was prepared as follows. That is, G and γ-methacryloxypropyltrimethoxysilane (hereinafter referred to as M) were mixed at G/M molar ratios of 1/1, 3/1, 5/1, 7/1 and 9/1. 0.2 Mole of each of the mixtures was taken, and 10.8 g of water was added thereto. Further, 2-methoxyethanol was added to obtain 78.0 g of a mixture. The mixture was cooled in a water bath. Then, while the mixture was being stirred at 10°–20° C., 2.0 g of 0.6N hydrochloric acid was added dropwise. After the dropwise addition, the whole mixture was stirred for about 2 days with water cooling, to obtain 80 g each of eight different GMH solutions in 2-methoxyethanol.

II. Preparation of First Liquid Compositions (Liquid Compositions for First Layer Film of High Refractive Index)

(1) Liquid compositions A-1 to A-5

The GH solution in 2-methoxyethanol obtained in the above I (1) was taken in an amount shown in Table 1 and added to 2-methoxyethanol together with 3.0 g of acetic acid. The mixture was stirred. Thereto was added a methanol-dispersed antimony pentoxide sol (AMT-130, a product of Nissan Chemical Industries, Ltd. having particle diameters of 20–60 mμ and a $Sb_2O_5$ content of 31.2%) in an amount shown in Table 1. There were further added, as a lubricant, 0.6 g of a 2-methoxyethanol solution containing 10% of a fluorine type surfactant (Fluorad FC-170C, a product of SUMITOMO 3M LIMITED) and, as a curing agent, 0.15 g of aluminum acetylacetonate. The mixture was stirred at room temperature for 4 hours. Then, the mixture was aged at 201° C. for 2 days to obtain liquid compositions A-1 to A-5 each weighing 92.0 g. In these compositions, the molar ratio of AMT-130 (as $Sb_2O_5$)/G was in a range of 38/62 to 84/16.

(2) Liquid composition A-6

A liquid composition A-6 [AMT-130 (as $Sb_2O_5$)/G=63/37] was obtained in the same manner as in the liquid compositions A-1 to A-5 of the above (1) except that 0.15 g of sodium acetate was used as a curing agent in place of 0.15 g of aluminum acetylacetonate.

(3) Liquid composition A-7

A liquid composition A-7 [AMT-130 (as $Sb_2O_5$)/G=100/0] was obtained in the same manner as in the liquid compositions A-1 to A-5 of the above (1) except that no GH solution in 2-methoxyethanol was used.

(4) Liquid composition A-8

A liquid composition A-8 [AMT-130 (as $Sb_2O_5$)/G=63/37] was obtained in the same manner as in the liquid compositions A-1 to A-5 of the above (1) except that a water-dispersed antimony pentoxide sol (A-1515P, a product of Nissan Chemical Industries, Ltd. having particle diameters of 5–10 mμ and a $Sb_2O_5$ content of 15.3%) was used in place of the methanol-dispersed antimony pentoxide sol.

(5) Liquid composition A-9

A liquid composition A-9 [AMT-130 (as $Sb_2O_5$)/G=63/37) was obtained in the same manner as in the liquid compositions A-1 to A-5 of the above (1) except that a water-dispersed antimony pentoxide sol (A-1515PL, a product of Nissan Chemical Industries, Ltd. having particle diameters of 30–60 mμ and a $Sb_2O_5$ content of 15.1%) was used in place of the methanol-dispersed antimony pentoxide sol and that 0.15 g of sodium acetate was used as a curing agent in place of 0.15 g of aluminum acetylacetonate.

(6) Liquid composition A-10

To 12.0 g of n-butanol were added 10.0 g of titanium tetrabutoxide as a compnent of high refractive index and 8.0 g of the GH solution in 2-methoxyethanol prepared in the above I (1). They were stirred at room temperature. Thereto were added, as a curing agent, 0.16 g of aluminum acetylacetonate and, as a lubricant, 0.1 g of a fluorine type surfactant (10% FC-170C), and the whole mixture was stirred for 4 hours to obtain a liquid composition A-10.

III. Preparation of Second Liquid Compositions (Liquid Compositions for Second Layer Film of Low Refractive Index)

(1) Liquid compositions B-1 to B-7

A water-dispersed colloidal silica (SI-40, a product of Catalysts and Chemicals Industries Co., Ltd. having particle diameters of 16–20 mμ and a $SiO_2$ content of 40–41%, abbreviated to ECS in Table 2) was taken in an amount shown in Table 2. Thereto was quickly added the solution of GMH (simultaneous hydrolyzate of γ-glycidoxypropyltrimethoxysilane and γ-methacryloxypropyltrimethoxysilane) dissolved in 2-methoxyethanol [the solution was prepared in the above I (2)] in an amount shown in Table 2, with stirring. Further, 0.5 g of acetic acid, 23.0 g of 2-methoxyethanol, 5.0 g of 2-propanol and 18.0 g of n-butanol were added in this order. The resulting mixture was stirred for 30 minutes. To the mixture being water-cooled were added 0.1 g of aluminum acetylacetonate and 0.05 g of fluorine type surfactant (10% FC-170C). The whole mixture was stirred for 4 hours to obtain liquid compositions B-1 to B-7 each having a molar ratio of colloidal silica (as $SiO_2$)/G/M as shown in Table 2.

(2) Liquid composition B-8

A liquid composition B-8 having a collidal silica (as $SiO_2$)/G/M molar ratio of 2/1/0 was obtained in the same manner as in the liquid compositions B-1 to B-7 of the above (1) except that the GH (hydrolyzate of γ- glycidoxypropyltrimethoxysilane) solution prepared in the above I (1) was used in place of the GMH solution.

(3) Liquid composition B-9

A liquid composition B-9 containing only GH as a film-forming component was obtained in the same manner as in the liquid compositions B-1 to B-7 of the above (1) except that no water-dispersed colloidal silica was used and the GH solution was used in place of the GMH solution.

(4) Liquid composition B-10

A second liquid composition was prepared using no water-dispersed colloidal silica. That is, to 16.5 g of 2-methoxyethanol being stirred were added 0.5 g of acetic acid, 3.0 g of the GMH solution (G/M molar ratio=3/1) prepared in the above I (2), 3.5 g of 2-propanol, 13.0 g of n-butanol, 0.05 g of a fluorine type surfactant (10% FC-170C) and 0.1 g of aluminum acetylacetonate in this order. The mixture was stirred at room temperature for 4 hours and then kept at 20° C. to obtain a liquid composition B-10 containing only GMH as a film-forming component.

(5) Liquid composition B-11

A second liquid composition was prepared using an alcohol-dispersed colloidal silica in place of a water-dispersed colloidal silica and using no GMH solution. That is, to 34.5 g of 2-propanol were added 6.08 g of an alcohol-dispersed colloidal silica (OSCAL 1432, a colloidal silica dispersion in 2-propanol, a product of Catalysts and Chemicals industries Co., Ltd. having particle diameters of 10–20 mμ and a $SiO_2$ content of 30%), 0.05 g of aluminum acetylacetonate and 0.1 g of a fluorine type surfactant (10% FC-170C) in this order. The mixture was stirred at room temperature for 4 hours to obtain a liquid composition B-11.

IV. Film Formation on Optical Article (1) A diethylene glycol bisallylcarbonate polymer lens (CR-39 planolens) was immersed in an aqueous 10% NaOH solution and then washed with water, 2-propanol and 1,1,2-trichloro-1,2,2,-trifluoroethane in this order. The resulting lens was coated with each of the liquid compositions A-1 to A-10 for first layer film of high refractive index prepared in the above II, under the spin coating condition shown in Table 1. Each coated composition was heat-cured at 120° C. for 2 hours to form a first layer film of high refractive index. The properties of the first layer film alone were examined. The reflectivity, optical film thickness and tintability of the film are shown in Table 1. As is clear from Table 1, the liquid compositions A-3, A-4, A-5 and A-6, all of which are first liquid compositions of the present invention, provide a first layer film superior in reflectivity and tintability.

TABLE 1

| Liquid composition | AMT-130 (g) | GH solution (g) | $Sb_2O_5$/G (molar ratio) | Spin coating condition (rpm) | Reflectivity (both sides) Rmax (%) | Reflectivity (both sides) Rmin (%) | nd (nm) | Tintability (80° C. × 2 min) (%) |
|---|---|---|---|---|---|---|---|---|
| Comparison | | | | | | | | |
| A-1 | 6.4 | 4.1 | 38/62 | 1500 | 12.3 | — | 140 | 35 |
| A-2 | 7.7 | 3.3 | 47/53 | 1300 | 13.2 | — | 140 | 37 |
| Present invention | | | | | | | | |
| A-3 | 9.4 | 2.6 | 58/42 | 1300 | 13.1 | — | 140 | 47 |
| A-4 | 10.3 | 1.7 | 70/30 | 1300 | 12.2 | — | 140 | 54 |
| A-5 | 12.1 | 0.9 | 84/16 | 2000 | 9.5 | — | 140 | 58 |
| A-6 | 9.7 | 2.2 | 63/37 | 1800 | 12.0 | — | 130 | 54 |
| Comparison | | | | | | | | |
| A-7 | 12.8 | — | 100/0 | 2500 | — | 6.3 | 150 | — |
| A-8 | A-1515P 19.6 | 2.2 | 63/37 | 1500 | — | 5.8 | 110 | 60 |
| A-9 | A-1515PL 19.9 | 2.2 | 63/37 | 1800 | 12.1 | — | 110 | 51 |
| A-10 | Ti(OBu)$_4$ 10.0 | 8.0 | — | 3000 | 14.0 | — | 170 | 59 |

AMT-130: Methanol-dispersed antimony pentoxide sol ($Sb_2O_5$ content: 31.2%, particle diameters: 20–60 mμ)
GH solution: Solution of hydrolyzate of γ-glycidoxypropyltrimethoxysilane (G) (solution of hydrolyzate of 0.2 mole of G, total amount: 80.0 g)
Rmax: Maximum reflectivity
Rmin: Minimum reflectivity
nd: Optical film thickness (refractive index × film thickness)
A-1515P: Water-dispersed antimony pentoxide sol ($Sb_2O_5$ content: 15.3%, particle diameters: 5–10 mμ)
A-1515PL: Water-dispersed antimony pentoxide sol ($Sb_2O_5$ content: 15.1%, particle diameters: 30–60 mμ)
Ti(OBu)$_4$: Titanium tetrabutoxide (2) In order to examine the properties of the second layer film of low refractive index alone, the CR-39 planolens which had been subjected to the same preliminary treatment as in the above (1) was coated with each of the liquid compositions B-1 to B-11 for second layer film of low refractive index prepared in the above III, under the spin coating conditions shown in Table 2. Each coated composition was heat-cured at 120° C. for 2 hours to form each low refractive index film directly on the CR-39 planolens.

The optical film thickness, scratching resistance and tintability of the low refractive index film are shown in Table 2. As is clear from Table 2, the liquid compositions B-1 to B-6, all of which are second compositions of the present invention, provide a coating film superior in scratch resistance and tintability.

The film obtained from the liquid compositions B-7 for comparison caused whitening.

TABLE 2

| | | Second Layer Film | | | Properties of second layer film (curing: 120° C. × 2 hours) | |
|---|---|---|---|---|---|---|
| Liquid composition | WCS (g) | GMH solution (g) | SiO$_2$/G/M (molar ratio) | Spin coating condition (rpm) | nd (nm) | Scratching resistance (SW) |
| Present invention | | | | | | |
| B-1 | 2.5 | 2.2 | 12/3/1 | 1500 | 120–140 | 4 |
| B-2 | 2.1 | 2.8 | 8/3/1 | 1500 | 150–170 | 4 |
| B-3 | 2.1 | 2.8 | 4/1/1 | 1500 | 140–160 | 4 |
| B-4 | 2.1 | 2.8 | 12/5/1 | 1500 | 140–160 | 4 |
| B-5 | 2.1 | 2.8 | 16/7/1 | 1500 | 140–160 | 4 |
| B-6 | 2.1 | 2.8 | 20/9/1 | 1500 | 140–160 | 4 |
| Comparison | | | | | | |
| B-7 | 1.3 | 3.4 | 4/3/1 | 1500 | — | — |
| B-8 | 2.1 | GH solution 2.8 | 2/1/0 | 1500 | 140–160 | 4 |
| B-9 | — | GH solution 4.2 | 0/1/0 | 1500 | 130–150 | 5 |
| B-10 | — | 3.0 | 0/3/1 | 2000 | 140–160 | 4 |
| B-11 | ACS 6.0 | — | 1/0/0 | 600 | 130 | 1 |

WCS: Water-dispersed colloidal silica (SiO$_2$ content: 40–41%, particle diameters: 16–20 mμ)
ACS: 2-Propanol-dispersed colloidal silica (SiO$_2$ content: 30%, particle diameters: 10–20 mμ)
GMH solution: Solution of simultaneous hydrolyzate of γ-glycidoxypropyltrimethoxysilane (G) and γ-methacryloxypropyltrimethoxysilane (M) [solution of simultaneous hydrolyzate of 0.2 mole in total of G and M, total amount: 80.0 g]
GH solution: Solution of hydrolyzate of G
MH solution: Solution of hydrolyzate of M
nd: Optical film thickness (refractive index × film thickness)
SW: Steel wool test (3) The CR-39 planolens which had been subjected to the same preliminary treatment as in the above (1) was coated with each of the liquid compositions A-1 to A-10 for first layer film of high refractive index prepared in the above II, under the spin coating conditions shown in Table 3. The coated composition was heat-cured at 120° C. for 20 minutes to form a first layer film of high refractive index. Then on this first layer film of high refractive index was coated one of the liquid compositions B-1 to B-11 for second layer film of low refractive index prepared in the above III, under the spin coating condition shown in Table 3. The coating composition was heat-cured at 120° C. for 2 hours to form a second layer film of low refractive index, whereby CR-39 planolenses each having one of anti-reflection films C-1 to C-19 were obtained.

The properties of the anti-reflection films are shown in Table 3.

As is clear from Table 3, the anti-reflection films C-3 to C-6 and C-11 to C-15 each formed using a first liquid composition and a second liquid composition both meeting the requirements of the present invention are superior in scratching resistance, adhesion, moisture resistance, hot water resistance, boiling water resistance, light resistance and appearance. In contrast, the anti-reflection films C-1 to C-2, C-7 to C-10 and C-16 to C-19 wherein at least either of the first and second liquid compositions used did not meet the requirements of the present invention, have non-uniformity or are poor in at least one test item. Thus, the excellency of the anti-reflection films obtained according to the present process has been confirmed.

TABLE 3

| | Constitution of anti-reflection film | | | | Anti-reflection Film Properties of anti-reflection film (first layer film: 120° C. × 20 min, second layer film: 120° C. × 2 hr) | | | | | | | | | | | |
|---|---|---|---|---|---|---|---|---|---|---|---|---|---|---|---|---|
| | First layer film | | Second layer film | | | | | | | | Hot water resistance Tinted portion/ | Boiling water resistance (SW) Immersion time | | | | |
| Anti-reflection film | Liquid composition | Spin coating condition (rpm) | Liquid composition | Spin coating condition (rpm) | Reflectivity (both sides) R min (%) | λmin (nm) | Scratching resistance (SW) | Adhesion | Moisture resistance (SW) | Tintability* (%) | (untinted portion) (SW) | 1 min | 5 min | 30 min | Light resistance | Appearance |
| Comparison | | | | | | | | | | | | | | | | |
| C-1 | A-1 | 1500 | B-2 | 1500 | — | — | — | — | — | — | — | — | — | — | — | X 1 |
| C-2 | A-2 | 1300 | B-2 | 1500 | — | — | — | — | — | — | — | — | — | — | — | X 1 |
| Present invention | | | | | | | | | | | | | | | | |
| C-3 | A-3 | 1300 | B-2 | 1500 | 3.2 | 580 | 4 | 100/100 | O | 56 | O/(O) | O | O | O | O | O |
| C-4 | A-4 | 1300 | B-2 | 1500 | 3.1 | 570 | 4 | 100/100 | O | 60 | O/(O) | O | O | O | O | O |
| C-5 | A-5 | 2000 | B-2 | 1500 | 3.1 | 510 | 4 | 100/100 | O | 59 | O/(O) | O | O | Δ | O | O |
| C-6 | A-6 | 1800 | B-2 | 1500 | 3.2 | 540 | 4 | 100/100 | O | 61 | O/(O) | O | O | O | O | O |
| Comparison | | | | | | | | | | | | | | | | |
| C-7 | A-7 | 2500 | B-2 | 1500 | 3.1 | 470 | 4 | 100/100 | O | 61 | Δ/(Δ) | O | Δ | Δ | O | O |
| C-8 | A-8 | 1500 | B-2 | 1500 | 5.0 | 610 | 4 | 100/100 | X(Δ) | 59 | Δ/(X) | O | X(Δ) | X | O | O |
| C-9 | A-9 | 1800 | B-2 | 1500 | 3.3 | 550 | 4 | 100/100 | Δ | 57 | O/(X) | O | O | X(Δ) | X | X 2 |
| C-10 | A-10 | 3000 | B-2 | 1500 | 3.1 | 660 | 3 | 100/100 | X | 61 | X/(X) | X | — | — | — | — |
| Present invention | | | | | | | | | | | | | | | | |
| C-11 | A-3 | 1300 | B-1 | 1500 | 2.6 | 550 | 4 | 100/100 | O | 54 | O/(O) | O | O | O | O | O |
| C-12 | A-3 | 1300 | B-3 | 1500 | 3.1 | 580 | 4 | 100/100 | O | 59 | O/(O) | O | O | O | O | O |
| C-13 | A-3 | 1300 | B-4 | 1500 | 3.1 | 590 | 4 | 100/100 | O | 54 | O/(O) | O | O | O | O | O |
| C-14 | A-3 | 1300 | B-5 | 1500 | 3.2 | 600 | 4 | 100/100 | O | 43 | O/(O) | O | O | O | O | O |
| C-15 | A-3 | 1300 | B-6 | 1500 | 3.2 | 600 | 4 | 100/100 | O | 32 | O/(O) | O | O | O | O | O |
| Comparison | | | | | | | | | | | | | | | | |
| C-16 | A-3 | 1300 | B-8 | 1500 | 3.3 | 610 | 4 | 100/100 | O | 9 | O/(Δ) | O | O | O | O | O |
| C-17 | A-3 | 1300 | B-9 | 1500 | 3.4 | 640 | 4 | 100/100 | Δ | 61 | O/(Δ) | O | O | Δ | Δ | X 2 X 3 |
| C-18 | A-3 | 1300 | B-10 | 2000 | 3.4 | 600 | 4 | 100/100 | Δ | 64 | O/(Δ) | O | O | Δ | Δ | X 2 X 3 |
| C-19 | A-3 | 1300 | B-11 | 600 | 0.6 | 570 | 1 | 100/100 | — | 54 | — | — | — | — | — | — |

*Tintability of CR-39 planolens: 63–66%

V. Test Methods

The CR-39 lenses having an anti-reflection film, obtained according to the process of the present invention were measured for their properties according to the following test methods.

(1) Reflectivity

The maximum reflectivity (Rmax), minimum reflectivity (Rmin) and wavelength at minimum reflectivity ($\lambda$min) of a CR-30 planolens coated on both sides were obtained from the spectral reflectance curve at 380–800 nm obtained using 340 Recording Spectrophotometer manufactured by Hitachi, Ltd. [In the spectral reflectance curve of each of the two-layer anti-reflection films, only one wavelength of minimum reflectivity is present in a visible light range (400–800 nm)].

Optical film thickness was calculated from the results obtained from the spectral reflectance curve obtained from a first or second layer film formed in a single layer in the same conditions as used in production of the two-layer anti-reflection film of the present invention.

(2) Scratching resistance

Was measured according to a steel wool (SW) test. That is, a coated surface was rubbed 10 strokes with a No. 0000 steel wool to which a load of 1 kg/cm$^2$ had been applied; the degree of scratching of the surface was observed visually; and the scratching resistance of the surface was evaluated according to the following criterion.

Criterion of Evaluation

5: Good
4: Less scratching than that of a CR-39 lens (base material) (Almost good)
3: About same scratching as that of a CR-39 lens
2: Heavily scratched
1: Anti-reflection film peeled due to scratching (3) Adhesion Was measured according to a cross-cut test (a cellophane tape peeling test). That is, using a knife, there were formed in an anti-reflection film in each of two crossed directions, 11 parallel cutting lines having a 1 mm interval between the adjacent lines and having a depth reaching a base material underlying the film, to form 100 squares each of 1 mm$^2$; a cellophane tape was attached thereon; then, the tape was peeled rapidly.

Criterion of Evaluation

100/100: Implies that the number of peeled squares is 0 (zero).
80/100: Implies that the number of peeled squares is 20.

(4) Moisture resistance

A coated lens was kept at 50° C. and 95% (RH) for 50 hours and then subjected to the steel wool test mentioned in the above (2), and the result was compared with the steel wool test result of the coated lens which had not been given the above moisture treatment.

Criterion of Evaluation

O: Steel wool hardness did not change.
$\Delta$: Steel wool hardness decreased.
X: Steel wool hardness decreased significantly (film peeled).
X ($\Delta$): Halfway between X and $\Delta$.

(5) Tintability

A coated CR-39 lens was immersed in a tinting solution (a dispersion of HOYA Disperse Dye Amber) at 80° C. for 20 minutes, and the tinting density was measured using the spectral transmittance curve obtained.

Tinting density (%) = 100 − [transmittance (550 nm) after tinting]

Incidentally, the CR-39 planolens per se (uncoated CR-39 planolens) had a tinting density of 63–66%.

(6) Hot water resistance

A coated lens was immersed in a tinting solution only at the lower half portion and tinted at 80° C. for 20 minutes (the upper half portion was not immersed); the tinted portion and the untinted portion were subjected to a steel wool test: and the results were compared with the steel wool test of the coated lens per se (non-immersed coated lens). The same evaluation criterion as in the above (4) was used.

(7) Boiling water resistance

A coated lens was immersed in 100° C. water for a given length of time; the resulting coated lens was cooled to room temperature with cold water; then, the coated lens was subjected to a steel wool test; and the reuslt was compared with the steel wool test result of the coated lens per se (non-immersed coated lens). The same evaluation criterion as in the above (4) was used.

(8) Light resistance

A coated lens was subjected to light irradiation for 250 hours, using a xenon long life weatherometer, WEL-25AX (a product of Suga Shikenki K.K.), and the shift of wavelength at minimum reflectivity was measured according to the method mentioned in the above (1).

Evaluation Criterion for Change of Wavelength at Minimum Reflectivity (Difference of Wavelength at Minimum Reflectivity before and after Light Resistance Test)

O: 0.5 nm
$\Delta$: 5–10 nm
X: 10 nm and above (9) Appearance

Was evaluated visually.

Criterion of Evaluation

0: Good
X①: There was no substantial formation of second layer film.
X②: There was change of interference color in moisture resistance test and tintability test.
X③: There were dots of no anti-reflection property, in anti-reflection film, and the film had severe unevenness of interference color.

The effects provided by the present invention are summarized as follows.

1. The present invention can provide an optical article with a two-layer anti-reflection film wherein the first layer film and the second layer film possess improved adhesion without appling any surface treatment to the first layer film.

2. The present invention can provide an optical article with a two-layer anti-reflection film having excellent scratching resistance without using an undercoat layer.

3. The present invention can provide an optical article with an anti-reflection film whose adhesion, scratching resistance, etc. remain unchanged even after having been subjected to a tinting treatment or to severe conditions (e.g. high temperature-high humidity conditions).

What is claimed is:

1. A process for producing an optical article with an anti-reflection film, which comprises the successive steps of:
   (1) coating an optical article having a refractive index of less than 1.65, a first liquid composition containing an alcohol-dispersed antimony pentoxide sol having particle diameters of 20–100 m$\mu$, a hydrolyzate of gamma-glycidoxypropyltrialkoxysilane, a curing agent and solvent, wherein the amount of the alcohol-dispersed antimony pentoxide sol is 55 to 85 mole %, calculated as $Sb_2O_5$, and the amount of the gamma-glycidoxypropyltrialkoxysilane is itself 45–15 mole %, and then heat curing the coated composition to form a first layer film of a high refractive index having an optical thickness of $\lambda/4$ (100–200 nm), and thereafter
   (2) coating on the first layer film of high refractive index formed in step (1), a second liquid composition
      containing a colloidal silica hydrolyzate of a gamma-glycidoxypropytrialkoxysilane, a hydrolyzate of a gamma-methacryloxypropyltrialkoxysilane, a curing agent and a solvent, provided that the molar ratio of the gamma-glycidoxypropyltrialkoxysilane itself to the gamma-methacryloxypropyltrialkoxysilane itself is from 1:1 to 9:1, that the hydrolyzates of both alkyloxysilanes are produced by simultaneous hydrolysis, and that the amount of the colloidal silica is 60 to 80 mole %, calculated as $SiO_2$, and the total amount of the gamma-glycidoxypropyltrialkosilane and gamma-methacryloxypropyltrialkoxysilane themselves is 40 to 20 mole %, and then heat curing the coated composition to form a second layer film of low refractive index having an optical film thickness of $\lambda/4$ (100–200 nm).

2. A process according to claim 1, wherein the first liquid composition, the second liquid composition, or both also contain a lubricant.

3. A process according to claim 1, wherein in the first liquid composition, the amount of the antimony pentoxide sol is 55–70 mole % and the amount of the gamma-glycidoxypropyltrialkoxysilane itself is 45–30 mole %.

4. A process according to claim 1, wherein in the second liquid composition, the molar ratio of the gamma-glycidoxypropyltrialkoxysilane itself to gamma-methacryloxypropyltriakloxysilane itself is 1:1 to 5:1.

5. An optical article with an anti-reflection film produced by the process according to claim 1.

6. An optical article with an anti-reflection film produced by the process according to claim 2.

7. An optical article with an anti-reflection film produced by the process according to claim 3.

8. An optical article with an anti-reflection film produced by the process according to claim 4.

* * * * *